Nov. 30, 1954
G. B. CARMAN
2,695,535
TOOL FEED APPARATUS
Filed Feb. 5, 1954
3 Sheets-Sheet 1
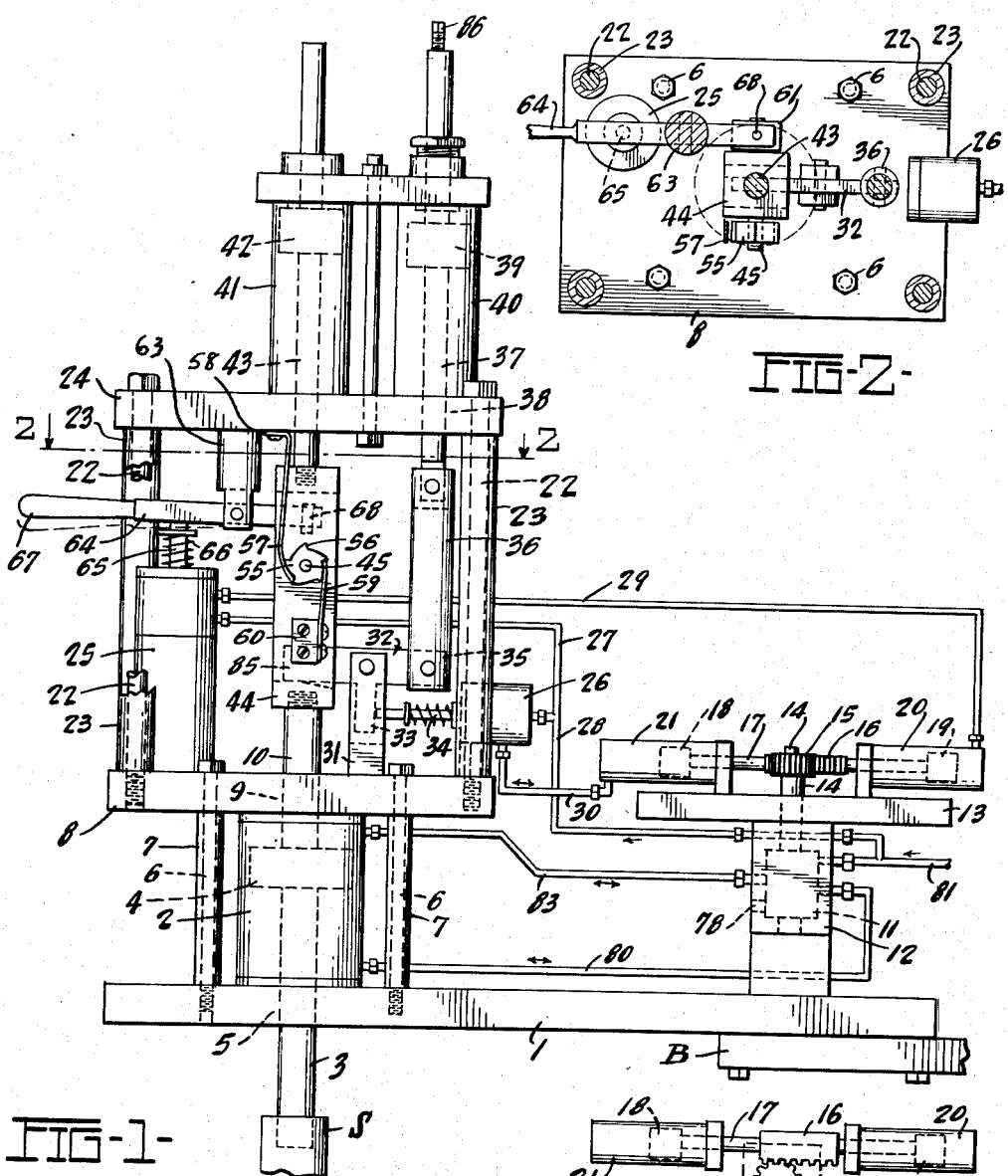
INVENTOR:
GLENN B. CARMAN.
BY W. P. Carr Nov. 30, 1954
G. B. CARMAN
2,695,535
TOOL FEED APPARATUS
Filed Feb. 5, 1954
3 Sheets-Sheet 2
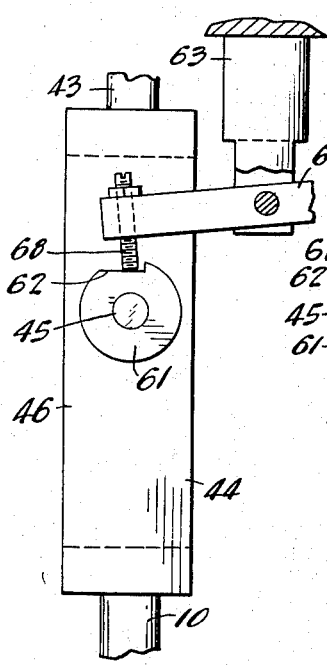
FIG-4-
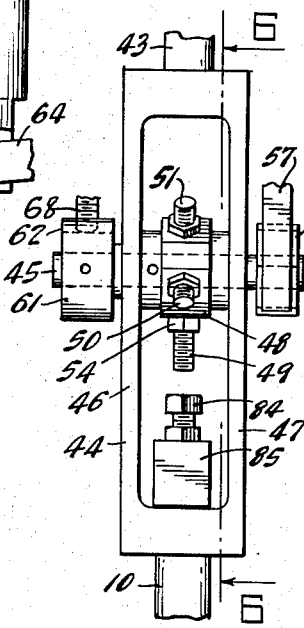
FIG-5
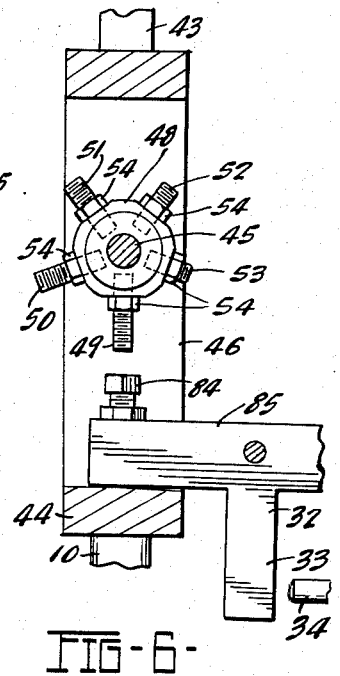
FIG-6-
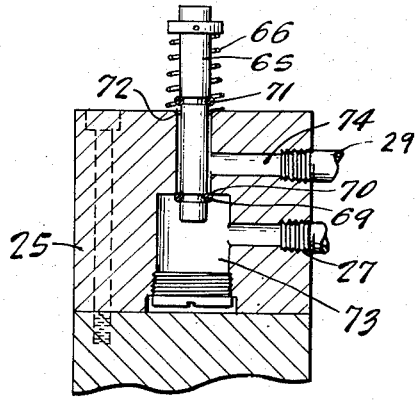
FIG-7-
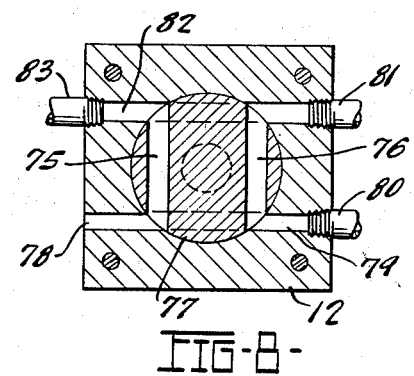
FIG-8-
INVENTOR:
GLENN B. CARMAN.
BY W. P. Carr Nov. 30, 1954 G. B. CARMAN 2,695,535
TOOL FEED APPARATUS
Filed Feb. 5, 1954 3 Sheets-Sheet 3
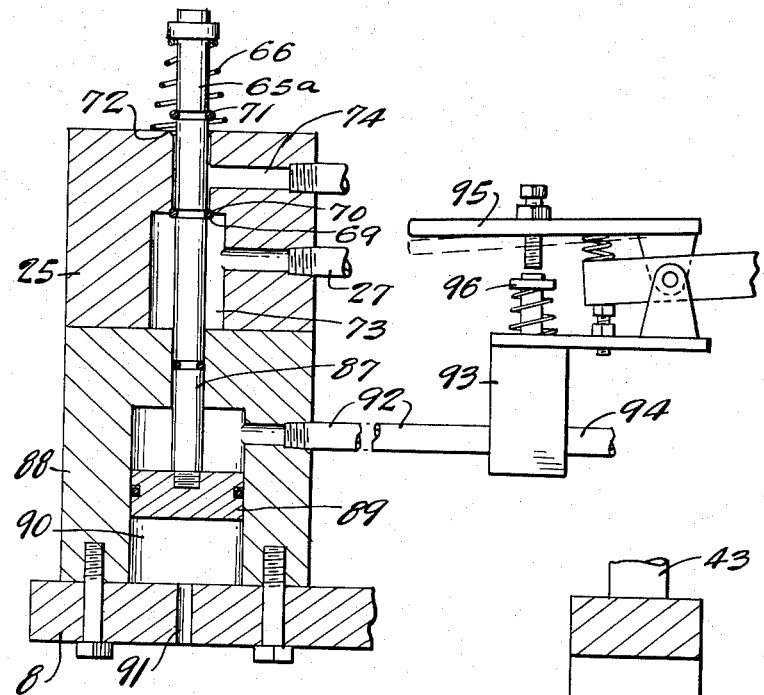
FIG-9-
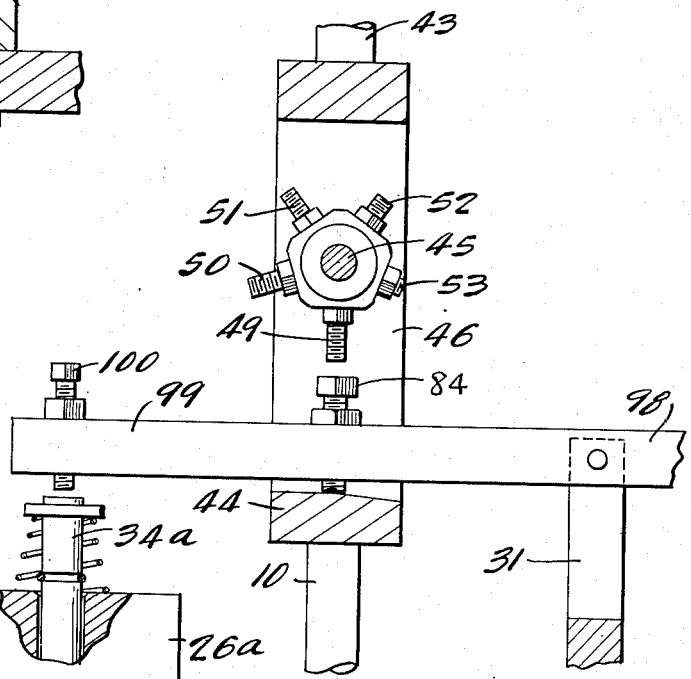
FIG-10-
INVENTOR:
GLENN B. CARMAN.
BY W. P. Carr

United States Patent Office 2,695,535
Patented Nov. 30, 1954

2,695,535

TOOL FEED APPARATUS

Glenn B. Carman, Cleveland Heights, Ohio, assignor to The De Vilbiss Company, Toledo, Ohio, a corporation of Ohio Application February 5, 1954, Serial No. 408,360

8 Claims. (Cl. 77—32.3)

This invention relates to apparatus for automatically advancing in a progressive, step by step manner, with intermediate retractions, a machine tool such as a drill.

It is well established that for accurate and uniform results in the drilling of holes, the drill must be retracted periodically to clear chips which may, after a certain accumulation, bind or bend the drill.

Also, generally known, is the fact that excessive pressure to increase the drilling speed may deflect the drill from its normal axial path.

Such difficulties are frequently encountered in the usual manual operations due to inexperienced workers, the urgency of operators on a piece-work basis, or attempts at hurried production for other reasons.

An object of this invention is to provide an apparatus which may be incorporated into, or attached to, a drill press or the like, and which automatically retracts the drill between successive advancing steps.

Another object of the invention is the provision of such an apparatus having means for selectively varying the amount of advance in each step of feeding movement.

An additional object is the provision of means for automatically terminating the drill movement after the completion of the full drilling operation on each work piece.

A further object of the invention is to provide apparatus which drives the drill at a predetermined speed while above its feeding position, and moves the drill at a reduced speed during its feeding or working period.

The apparatus through which such objects are achieved includes a main piston actuated by fluid under pressure, which directly provides the main advancing motion to the drill spindle and drill.

Associated in movement with the piston rod of the main piston is a stop device which interrupts the downward movement of the drill spindle at progressively lower depths. Cushioning means are provided which not only cause the spindle to move at a stabilized rate through its non-working course, but also reduce the rate of movement during the feeding action. Among other cooperative elements, are devices which direct the fluid actuating the main piston to alternate ends of the piston, at the completion of each stroke.

An apparatus embodying this invention is presented in the following description and the accompanying drawings. With a study thereof, other objects and advantages in addition to those recited should become apparent.

In the drawings,

Figure 1 is a side elevation of an apparatus embodying my invention;

Figure 2 is a fragmentary, horizontal section taken on the line 2—2 of Figure 1;

Figure 3 is a plan view of the actuating mechanism of the main control valve with the casing for the valve shown in dotted lines;

Figure 4 is a fragmentary elevation of the side opposite to that of Figure 1, showing the cam which terminates action of the apparatus at the finish of the full cycle of a drilling operation;

Figure 5 is a front view as seen from the left of Figure 1 of the same portion of the apparatus presented in Figure 4;

Figure 6 is a vertical section taken on the line 6—6 of Figure 5;

Figure 7 is a vertical section of the valve from which air is delivered to the actuating mechanism of the main control valve when the spindle reaches its uppermost position; and Figure 8 is a horizontal section, rather diagrammatic in nature, of the main control valve.

Figure 9 illustrates an alternate form of valve to replace valve 25.

Figure 10 is a modified form of lever to replace the T-shaped lever shown in preceding figures.

As presented in Figure 1, the apparatus is mounted on a horizontal base 1. Immediately upon the base is the main piston cylinder 2 from which the lower rod 3 of the piston 4 depends through an opening 5 in the base into driving contact with the spindle S of the drill press over which the apparatus is supported by bracket B. In the conventional drill press the spindle carrying the drilling tool is spring impelled upwardly and is manually depressed to bring the drill into contact with the work piece.

Held above the base 1 by bolts 6, and tubular spacers 7, is the primary platform 8. The upper rod 10 of the piston 4 extends through an opening 9 in the platform 8.

Supported by base 1 is the control valve 11 which is actuated to alternately deliver air under pressure to one end while venting to the atmosphere the other end of the cylinder 2. Resting upon the top of the casing 12 of the control valve 11 is a plate 13 through which the oscillatable shaft 14 of valve 11 projects. Fixed to the shaft is a pinion gear 15. The gear meshes with rack 16 forming a part of the floating piston rod 17 common to tandem pistons 18 and 19 in opposed cylinders 20 and 21. The latter are mounted on plate 13. These elements comprise the actuating mechanism for control valve 11.

Held by bolts 22 and tubular spacers 23 above primary platform 8 is a secondary platform 24.

Mounted on the primary platform are two air valves 25 and 26 to which constant air supply lines 27 and 28 lead in series. The valves respectively have lines 29 and 30 for delivering air to the outer ends of opposed cylinders 20 and 21.

Post 31 set on platform 8 has pivoted to one side of its upper end a T-shaped lever 32. The depending arm 33 of this lever 32 is in position to act upon the valve stem 34 to open valve 26 against the spring tension holding it closed. The horizontal arm 35 of the lever 32 is connected to the lower bifurcated end of link 36. The upper end of the link is fastened to the plunger 37, which extends downwardly through an opening 38 in secondary platform 24. The plunger 37 is connected to a piston 39 in the dash pot or cushioning hydraulic cylinder 40 supported on the secondary platform 24.

Also mounted on the secondary platform utilizing a common cylinder head member with cylinder 40 is a speed stabilizing hydraulic cylinder 41. Downwardly projecting from the piston 42 in this cylinder through an opening in the platform is piston rod 43. This rod is axially aligned with the upper piston rod 10 of the main piston 4 and joined with rod 10 by laterally apertured connector block 44.

A horizontal shaft 45 is journalled between the two upright portions 46 and 47 of the block 44 which define the sides of the aperture. The ends of the shaft extend through and exteriorly of said uprights as may be best seen in Figure 5.

Fixed to the center part of the shaft 45 is a turret 48 into which are threaded at equally spaced points radially directed studs 49, 50, 51, 52 and 53. These are held in selected axial positions by lock nuts 54. The studs are five in number and starting with the longest 49, decrease in projecting length clockwise as viewed in Figure 6.

On the end of shaft 45 which projects to the exterior side of upright 47 is a ratchet 55 (see Figure 1). This has five equidistant teeth 56 which are singly and successively engaged by pawl 57 on each upward movement of the connector block 44 with the main piston 4, and the shaft 45 is thus given a continuous series of 72° turns.

The pawl 57 is secured in place by the bolt 58 threaded into the underside of the secondary platform 24. A spring retainer 59 held by the fixture 60 on the side of upright 47 presses against ratchet 55 to hold it in the positions to which it is successively revolved by pawl 57.

On the opposite exterior end of the shaft 45 is pinned a revolving cam 61 the peripheral cam surface of which is cylindrical except for the shouldered flat bottomed notch 62 illustrated in Figures 4 and 5.

A hanger 63 on the underside of platform 24 pivotally supports a valve lever 64. One end of the lever rests upon the top of the valve stem 65 which is yieldably held upwardly by the spring 66. A hand portion 67 on the lever is provided for manual operation. The other end of the lever holds the threaded contact pin 68 positioned in line with the vertical travel of the revolving cam 61 as the latter moves with the connector block 44.

When the apparatus is ready for operation, its various parts are in the positions depicted in the drawings. The base 1 has been rigidly secured above the drill press, the operation of which is to be guided by the apparatus. The stroke limiting studs 49 through 51 have been selected by length and adjustment to provide the depth of drilling desired for each step of the drilling cycle. The first work piece has been placed in the jig or fixture clamped on the work table of the press, and is ready to be drilled. The cycle is then begun by manually depressing the lever 64 against valve stem 65 to open valve 25. As may be observed in Figure 7, the O-ring 69 constitutes the main valve member of valve 25 and is moved away from its seat 70 by downward movement of the valve stem 65. Such action simultaneously brings O-ring vent valve 71 to its seat 72.

Consequently, air under pressure constantly available from supply line 27 travels from chamber 73 past O-ring valve member 69 into bore 74 and air line 29 leading to the outer end of cylinder 20. The air acting upon piston 19 in cylinder 20 impels it to the left as viewed in Figure 1 and therethrough pushes the piston rod 17 and its integral rack 16 to the limit of their leftward movement. This turns the pinion gear 15 and the valve shaft 14 counterclockwise as viewed in Figure 3 with the parts formed and associated to turn the shaft and the control valve 11 through an arc of 90°.

This swings the passages 75 and 76 in the valve member 77 from the vertical positions shown in Figure 8 to horizontal positions. In the new location, passage 75 connects the vent opening 78 to the bore 79 which communicates through line 80 with the lower end of the main cylinder 2. Passage 76 now connects the air supply inlet 81 with bore 82 communicating through line 83 with the upper end of the main cylinder 2.

The compressed air thus delivered to the upper end of the main cylinder 2 by acting upon the upper surface of piston 4 forces the piston and its lower rod 3 downwardly, the latter having driving engagement with the spindle S of the associated drill press. Air on the opposite side of piston 4 is exhausted through line 80 to vent opening 78.

The upper piston rod 10 follows piston 4 downwardly and pulls with it connector block 44 and rod 43 from hydraulic cylinder 41.

It should be apparent that the aligned elements comprising the lower piston rod 3, piston 4, upper piston rod 10, connector block 44, hydraulic piston 42, and its piston rod 43, all move in concert whenever the main piston 4 is motivated.

The hydraulic cylinder 41 is filled with oil which escapes past the piston 42 within the cylinder through slight predetermined clearance between the piston and the inner wall of the cylinder whenever the piston is moved. This clearance is selected to permit sufficient flow of the oil to stabilize the rate of movement of the main piston and the drill spindle without significant retarding effect. A restricted opening through the stabilizing piston 42 could serve as well as the selected clearance.

With the further descent of connector block 44, limiting stud 49 meets the head of the contact bolt 84 in arm 85 of the T-shaped lever 32 as may be understood by observance of Figures 5 and 6. This contact turns the lever upon its pivot moving the horizontal arm 35 upwardly against the plunger 37 to which is is joined by link 36. The oil flow past the piston 39 in cylinder 40 is restricted by a passage through the piston controlled by elongated adjusting screw 86. The oil flow is so minimized that a heavy cushioning or dash pot effect is developed which greatly reduces the advancing speed of the spindle movement. This slackening is timed to the point where the drill is closely adjacent the work piece and therefore the subsequent feed of the drill into the work piece is at a rate sufficiently moderate to avoid deflection of the drill.

With slight further pivoting of the T-shaped lever 32 under the impact of stud 49 the depending arm 33 of the lever abuts the valve stem 34 of valve 26 which is internally designed similarly to valve 25 as illustrated in Figure 7. Compressed air is thus transmitted through valve 26 from supply line 28 and delivered therefrom through line 30 to the outer end of cylinder 21. This air acting upon piston 18 moves rack 16 to the right as seen in Figure 1, and rotates control valve 11 back 90° to the position presented in Figure 8.

The upper end of cylinder 2 is thus exhausted through line 83, bore 82, passage 75, and the vent opening 78 of the control valve 11, and compressed air is delivered to the lower end of cylinder 2 from the air supply inlet 81, passage 76, bore 79 and air line 80.

The piston 4 with its rod 3 is accordingly driven rapidly upwardly followed by the drill spindle S raised by the conventional spring bearing against the spindle. The retraction of the drill from the work is therefore quickly accomplished, and objectionable chips removed.

The ascent of the piston 4 is smoothed by the action of the stabilizing hydraulic cylinder 41.

The fixed pawl 57 meets a tooth 56 of the ratchet 55 as the latter rises with the connector block 44 and the ratchet with the shaft 45 is given a 72° rotation. This turns the turret 48 counterclockwise in Figure 6 bringing the shorter stud 50 down into the original position of stud 49.

Likewise cam 61 is turned in a similar arc clockwise as seen in Figure 4. This brings a cylindrical surface portion of the cam in line with the threaded pin 68 in place of the notch 62.

At the finish of the upward course of the aligned elements, traveling with piston 4, the bottom of the aperture through the connector block 44 abuts the underside of arm 85 of T-shaped lever 32. This lowers the opposite arm 35 and through rod link 36 and plunger rod 37, draws dash pot piston 39 downwardly to its original position. This cushions the termination of the upward movement. The stopping point is established by piston 42 reaching the top of cylinder 41 and is so set that the rounded surface of cam 61 meets and raises threaded pin 68 enough to tilt lever 64 and open valve 25. This action, accomplished automatically at this point, was manually necessary at the start of the drilling cycle. As in the first instance, air from valve 25 reaches the outer side of piston 19 in cylinder 20 and the rack 15 is moved back to the left in Figure 1. This rotates valve 11, bringing air to the top of main piston 4 to again rapidly move the drill spindle downwardly.

On this excursion the advance of the drill is deeper as the shorter stub 50 must travel an additional distance equal to its difference in length from that of stub 49 before meeting contact bolt 84 and bringing the descent of the aligned elements to its termination. Before the subsequent retraction the drill accordingly is fed further into the work piece to the extent of the predetermined difference in length between studs 49 and 50.

In the same manner as in the initial stroke, the feeding movement is retarded to a desired slackened rate by dash pot cylinder 40 before the abutting of piston 39 with the top of cylinder 40 acts as the final stop.

Through the continued indexing of ratchet 55 by pawl 57 a successively shorter stud is brought into action and the rounded surface of cam 61 continues to initiate the subsequent descent for the complete set of five studs.

After the drill has been advanced into the workpiece to the final depth desired in the fifth and last step as monitored by the shortest stub 53, on the return upward trip the pawl acts to bring the starting stub 49 into actuating position and to rotate cam 61 bringing notch 62 once again to the top of the cam. The leeway provided by this notch is such that no upward push is given the threaded pin 68 and air valve 25 consequently remains unopened. With no air thus delivered to the upper side of main piston 4, the piston 4 with all elements aligned with it is held in its uppermost stopped position.

As the drilling cycle is now completed the work piece operated upon is replaced with new stock and the second full sequence of drilling is begun by manual depression of lever 64 to open valve 25.

The amount of feed into the work on each stroke may vary considerably under different conditions. For instance, for very fine comparatively shallow drilling the first descent of the drill may be set for merely spotting the surface, with following increments progressively increasing in length. The procedure assures the most exact establishment of the first portion of the bore, which acting as a guide for the drill thereafter, permits longer feeding strokes to follow. In such a method the accumulation of chips is not a serious hazard, as even the final feeding advance is not of sufficient length to create any objectionable quantity of chips.

In general, accuracy would not be such a critical factor. A more common example might involve the drilling of a hole .500 inch deep. For an operation of this type the five feeding steps could be set up in the following sequence—.165; .110; .095; .075; and .055. This progressive shortening of the increments of advance is adapted to offset the increasing possibility of difficulty from chips as the hole is deepened. This danger is due to the increase in the length of the path the chips must follow in being discharged from the bottom of the bore up the drill to the outer surface.

The five drilling steps provided by the described embodiment of this invention are illustrative only, as a lesser or greater number of limiting studs synchronized with a suitable ratchet could be utilized just as satisfactorily from an operating standpoint.

In Figure 9 is illustrated an alternate form of valve to replace valve 25. In the embodiment of Figure 1 valve 25 is equipped with hand lever 64 which is manually depressed to open the valve and thus initiate each drilling cycle. There may be occasions where a series of holes of the same dimensions are to be drilled in each work piece and an indexing arm is swung back and forth to bring each successive hole location in position to be drilled. In such a case the movement of the indexing arm through the structure presented in Figure 9 may be utilized to automatically start each drilling cycle.

This is accomplished by having the valve stem 65a constructed with a depending extension 87 projecting through the lower casing 88 into an air cylinder 90 where it is connected to a piston 89. This piston is normally held in its upper position by valve spring 66 with the valve O-ring against its seat.

The lower portion of the air cylinder 90 is vented to the atmosphere through opening 91 in platform 8. The upper end of the cylinder 90 has communication through line 92 with an air supply valve 93 which is connected to an air source 94. The air supply valve is positioned adjacent the indexing arm 95 which in the final position of its movement contacts and momentarily depresses valve stem 96 to permit a temporary flow of air into cylinder 90 to move piston 89 downwardly. This opens valve 25 and initiates the drilling cycle without additional action by the operator. In high production with numerous holes in each piece considerable time would be saved. Where only a single hole is to be drilled in each piece, there may be some saving in having the valve 93 actuated by the movement of the jig locking arm.

In Figure 10 is a modified form of lever to replace T-shaped lever 85 shown in the preceding figures. Instead of having a depending arm such as 33 of lever 85 this alternate design 98 has an elongated horizontal arm 99 which carries contact bolt 84 at its midsection and at its outer end supports an adjustable valve opening bolt 100. Valve 26 is repositioned as valve 26a to a location below bolt 100 on platform 8 and is provided with a shortened valve stem 34a. In its new location valve 26a functions in a manner similar to that previously described. However in this alternate arrangement it is more accessible and with adjustable bolt 100 its action may be more accurately timed.

From the foregoing it is believed apparent that an apparatus has been provided capable of accomplishing the objects initially set forth with benefits in addition to those specified. As indicated by the disclosed modifications, alterations may be made without departing from the spirit of the invention or without avoiding the scope of the following claims.

What is claimed is:

1. In an apparatus of the type described a tool spindle driving rod, a vertically reciprocable main piston fixed to the upper end of the driving rod, a main cylinder containing the main piston, means delivering motivating air alternately to the upper and lower faces of the main piston, an extension rod projected upwardly from the main piston, a movement stabilizing cylinder above and coaxial with the extension rod, a hydraulic piston in the stabilizing cylinder, means restricting flow past said hydraulic piston, a piston rod depending from the stabilizing cylinder, a connector block joining the piston rod with the extension rod—the driving rod, the main piston, the extension rod, the hydraulic piston, the piston rod and the connector block being thus integrally joined together in alignment and moving together with vertical reciprocation of the main piston—means carried by the connector block acting with the means delivering motivating air to the main piston to change the delivery of air from one to the other face of the main piston at the upper and lower limits of the vertical reciprocation of the main piston, a number of movably mounted stop members of non-uniform length included in said means carried by the connector block, means moving the stop members successively into effective position to determine the lower limit of each successive reciprocation of the main piston, and stationary means meeting the downward thrust of each stop member when moved to its effective position.

2. An apparatus as set forth in claim 1 in which there is a speed retarding cushioning piston engaged by the connector block in the final portion of the downward motion, said cushioning piston acting to reduce the rate of travel of the tool spindle driving rod during the working period of the machining tool.

3. In an apparatus of the type described, a vertically extending tool spindle driving rod, a reciprocable main piston fixed to the upper end of the driving rod, an extension rod projected upwardly from the main piston, a main air valve having alternate positions in one delivering motivating air to the upper face and in the other delivering motivating air to the lower face of the main piston whereby the main piston, the driving rod and the extension rod may be vertically reciprocated by successive movement of the air valve from one to the other position, pneumatically controlled means moving the air valve from one position to the other, a first and a second air control valve adjacent the vertical path of the extension rod, both of said control valves having actuating connection with the pneumatically controlled means, elements carried by the extension rod opening the first control valve at one limit of vertical movement of the extension rod and opening the second control valve at the other limit of such vertical movement, whereby the main air valve is moved from one position to the other at each such limit and the delivery of air is transferred to the opposite face of the main piston to motivate the piston in the opposite direction, a series of stop members carried by the extension rod, and means moving said stop members successively into position to determine the limit of downward movement of the extension rod.

4. In an apparatus for automatically advancing in a progressive, step-by-step manner, with intermediate retractions, a machine tool such as a drill, a vertically extending tool spindle driving rod, a vertically reciprocable main piston fixed to the upper end of the driving rod, supply means communicating with the upper and lower faces of the main piston for delivering piston motivating air alternately to said faces, an extension rod projected upwardly from the main piston, a governing block carried by the extension rod, a rotatable shaft mounted transversely on the block, a ratchet with uniformly spaced teeth pinned on the shaft, a depending stationary pawl engaging a tooth of the ratchet and turning the ratchet through an angle of uniform size on each upward movement of the block, means holding the ratchet in position between engagements of the pawl, a turret mounted on the shaft and turning therewith, studs of varying lengths projecting radially from the turret, said studs being circumferentially spaced so that the angle between the two adjoining studs is equal to that of each turn of the ratchet, a cam of irregular outline on the shaft and rotated therewith, an actuator for the supply means in the path and contacted by a downwardly projecting stud near the end of downward travel of the governing block causing the supply means to deliver motivating air to the lower face of the main piston to move the main piston, the extension rod and the governing block upwardly, and a second actuator for the supply means in the path of the cam of irregular outline and in most rotated positions of the cam activated by contact with the cam near the end of upward travel of the governing block to cause the supply means to deliver motivating air to the upper face of the main piston to move the main piston, the extension rod and governing block downwardly, there being a position of the cam when due to its irregular outline it does not contact and activate the second actuator whereby the reciprocating movement is terminated.

5. An apparatus according to claim 4 in which the actuators are air valves opened by contact with the studs and the cam.

6. An apparatus according to claim 5 in which there is means associated with a moving part of the machining device with which the apparatus is used and said means is energized by contact with the moving part to open the air valve constituting the second actuator after the reciprocating movement has been terminated by non-contact of the cam with the air valve or second actuator.

7. In an apparatus according to claim 5, a lever receiving the thrust of each stud and relaying the thrust to open the air valve, a motion retarding piston, a piston rod therefor, and an arm of the lever meeting the piston rod and restrained in movement thereby prior to the opening of the air valve by the lever.

8. An apparatus according to claim 5 in which the studs are successively shorter in length with the longest one projecting downwardly at the initiation of the drilling cycle and the cam opens the air valve constituting the second actuator on each ascent of the governing block except the ascent following the descent when the shortest stud is in a downwardly projected position.

References Cited in the file of this patent

UNITED STATES PATENTS

| Number | Name | Date |
|---|---|---|
| 1,977,490 | Sawyer | Oct. 16, 1934 |
| 1,998,873 | Kingsbury | Apr. 23, 1935 |